United States Patent [19]

Tajima

[11] Patent Number: 4,504,938
[45] Date of Patent: Mar. 12, 1985

[54] DEVICE FOR FEEDBACK CONTROLLING FOCUS OF AN OPTICAL SYSTEM IN AN INFORMATION RECORDING/REPRODUCING APPARATUS

[75] Inventor: Osamu Tajima, Ayase, Japan

[73] Assignee: Victor Company of Japan, Limited, Japan

[21] Appl. No.: 367,035

[22] Filed: Apr. 7, 1982

[30] Foreign Application Priority Data

Apr. 7, 1981 [JP] Japan .................. 56-51956
Nov. 1, 1981 [JP] Japan ................. 56-174930

[51] Int. Cl.³ .............................................. G11B 7/00
[52] U.S. Cl. ...................... 369/45; 369/46; 369/109; 369/112
[58] Field of Search ............... 369/44, 45, 46, 109, 369/110, 112; 250/201, 202

[56] References Cited

U.S. PATENT DOCUMENTS

| | | | |
|---|---|---|---|
| 3,971,002 | 7/1976 | Bricot et al. | 369/46 |
| 4,059,841 | 11/1977 | Bricot et al. | 369/46 |
| 4,143,402 | 3/1979 | Bricot et al. | 369/45 |
| 4,390,781 | 6/1983 | Musha | 369/45 |
| 4,422,168 | 12/1983 | Ito et al. | 369/45 |
| 4,423,495 | 12/1983 | Musha et al. | 369/45 |

Primary Examiner—Donald E. McElheny, Jr.
Attorney, Agent, or Firm—Lowe, King, Price & Becker

[57] ABSTRACT

In a feedback focus control system of an information recording/reproducing apparatus, an interference filter is disposed in the path of the light reflected at an optical disk so that the reflected light is transmitted through or reflected at the interference filter before it is received by a composite optical detector having a plurality of photosensitive elements. In one embodiment, the interference filter is inclined with respect to the optical axis so that the intensity of the transmitted or reflected light is positioned at a steep slope portion of an intensity vs phase difference characteristic curve. Two photosensitive elements are provided to detect the difference in intensity of the transmitted or reflected light at two portions on both sides of the optical axis. In another embodiment, an interference filter having two portions which are respectively inclined in opposite direction is used, while the optical detector comprises four photosensitive elements arranged in the form of four-quadrant. In another embodiment the light transmitted through the interference filter and light reflected at the same are respectively detected by two optical detectors each having two photosensitive elements.

27 Claims, 16 Drawing Figures

DEVICE FOR FEEDBACK CONTROLLING FOCUS OF AN OPTICAL SYSTEM IN AN INFORMATION RECORDING/REPRODUCING APPARATUS

BACKGROUND OF THE INVENTION

The present invention relates generally to apparatus for optically recording and/or reproducing information on and from an optical disk and, more particularly, the present invention relates to a device for feedback controlling focus of an optical system of such an optical recording and/or reproducing system so that a light spot on a record disk is focused irrespective of the disk attitude.

Various types of information recording and/or reproducing systems for deriving prerecorded information on a disk are known. In one system, the prerecorded information is reproduced optically by irradiating an optical disk surface with a light beam. It is desirable for such a light beam to be focused so it is incident at a predetermined point on the disk, to provide a minute spot. However, the focusing condition is apt to be interrupted because of variations in distance between a condenser lens of an optical system and an information track of the rotating optical disk. Conventional systems compensate for such defocusing caused by these distance variations with an automatic feedback control system that maintains the distance between a condenser lens of an optical system and an illuminated information track in the optical system constant by driving the condenser lens in a direction normal to the disk. Such a conventional feedback control system, referred to as a focus controlling system, produces a focusing error signal to indicate the degree of defocusing. Two prior art systems for producing such a focusing system are known. In one prior system, an astigmatic system uses a condenser lens, a cylindrical lens and a four-quadrant composite optical sensor. In a second prior art knife-edge system, a condenser lens, a knife-edge and two-section composite optical sensor are employed. The prior art systems, however, require a relatively long optical path because it is necessary to reimage a light spot focused on the disk at some place in the optical path. Such a long optical path results in a bulky, and difficult to use optical system.

Another conventional feedback focus controlling system uses a detecting prism that is positioned so that a reflecting surface thereof makes a critical angle with respect to an optical axis. Light reflected from the reflecting surface is applied to a two-section composite optical sensor. To increase the sensitivity of such a system, it is necessary to use a prism having a reflecting surface which reflects a light beam several times. Such a prism is bulky, causing the entire optical system to become large. In addition, the size of the optical system is relatively large because of the requirement for refraction or off-set of the optical system. Furthermore, this system requires difficult, time consuming adjustment during manufacturing, resulting in high manufacturing costs.

SUMMARY OF THE INVENTION

The present invention has been developed to remove the previously mentioned disadvantages inherent in conventional feedback focus control in optical disk information recording and/or reproducing apparatus.

It is, therefore, an object of the present invention to provide a new and improved feedback control focus device of an optical system in an optical information recording and/or reproducing apparatus, wherein the optical system is adjusted more readily during manufacture.

Another object of the invention is to provide a new and improved feedback control focus device in an optical system of an optical information recording and/or reproducing apparatus, which optical system occupies less space than prior art systems.

A further object of the present invention is to provide a new and improve relatively low cost device for feedback controlling focus of an optical system in an optical information recording and/or reproducing apparatus.

According to the present invention, an interference filter, either of the transmission type or of the reflecting type, is disposed along an axis of a light beam reflected from an optical disk track so that the reflected light is either transmitted through or reflected from the interference filter prior to being incident on a composite optical detector. In one embodiment, the interference filter is inclined with respect to the optical axis, which divides the filter into two halves. The difference in the incident angle on the two halves of the interference filter causes two photosensitive elements of the composite optical detector to produce output signals having different amplitudes. The output signals are processed to derive a focusing error signal indicative of the degree of defocusing. The focusing error signal causes the condenser lens of the optical system to be driven to minimize the focusing error. In a second embodiment, an interference filter has two portions which are oppositely inclined with respect to the optical axis. A composite optical detector comprises four photosensitive elements arranged in a four-quadrant array that is responsive to light transmitted through the interference filter.

In a further embodiment, two composite optical detectors, each having two photosensitive elements, are separately disposed to receive light respectively transmitted through an interference filter and light reflected from the interference filter.

The above and still further objects, features and advantages of the present invention will become apparent upon consideration of the following detailed description of one specific embodiment thereof, especially when taken in conjunction with the accompanying drawings.

DETAILED DESCRIPTION OF THE PREFERRED EMBODIMENTS

Figures 1, 2, 3, 4, 5:
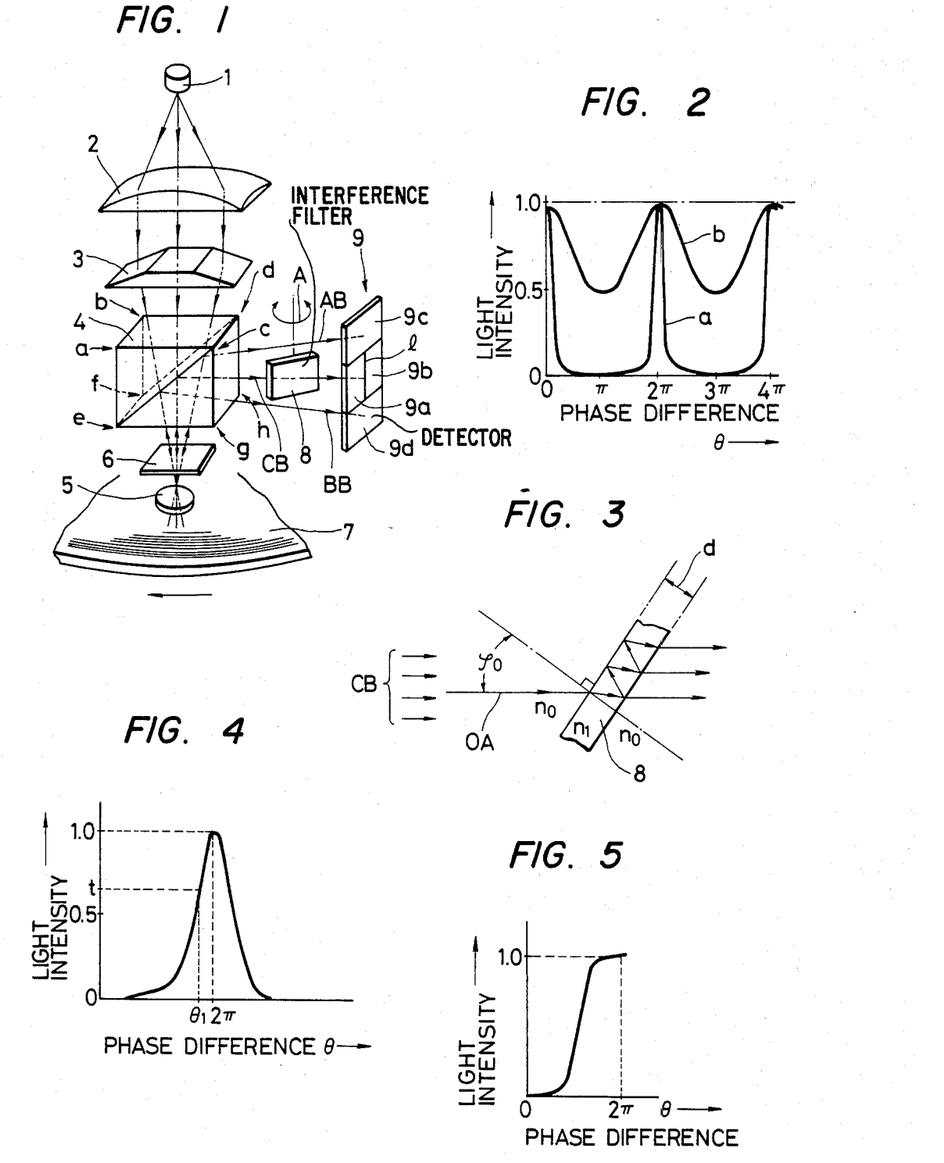
FIG. 1 is a schematic perspective view of an optical disk irradiated by a light beam and an optical system in accordance with the present invention.
FIG. 2 is a graphical representation of a relationship between transmitted light intensity and phase difference in an interference filter shown in FIG. 1.
FIG. 3 is an explanatory diagram to assist in describing the operation of the interference filter illustrated in FIG. 1.
FIG. 4 is a graphical representation of light intensity versus phase angle of the interference filter illustrated in FIG. 1.
FIG. 5 is a graphical representation of light intensity versus phase difference of a wide band filter.

Reference is now made to FIG. 1, a schematic perspective view of an optical system for transducing information from an optical disk of the type incorporated in an information reproducing apparatus, such as a video disk player. Information is optically recorded on disk 7 in a phase structure that is reproduced by an optical system which scans spiral or coaxial tracks on disk 7. Although the following embodiments of the invention are described in connection with an information reproducing apparatus, it is to be understood that the invention may be used in connection with optical information recording devices.

The optical system of FIG. 1 comprises semiconductor laser light source 1, which directs a diffuse coherent light beam through collimating lens 2, thence trapezoidal prism 3 and polarizing prism 4. Light transmitted through polarizing prism 4 passes through quarter wavelength plate 5, thence is incident on disk 7 by way of condenser lens 5. Light reflected from disk 7 is coupled back to polarizing prism 4 by way of condenser lens 5 and quarter wavelength plate 6. Light from disk 7 is internally reflected in prism 4 and is coupled to composite optical photosensor or detector 9. The rays emitted by semiconductor laser 1 and collimated by lens 2, are divided into three beams by trapezoidal prism 3.

The three beams emanating from prism 3 are applied via polarizing prism 4, quarter wave plate 6 and condenser lens 5 to an information track of optical disk 7, rotating at a predetermined speed on a turntable (not shown). Polarizing prism 4 and quarter wave plate 6 separate the incident light and reflected light from each other. The three beams leaving prism 3 are transmitted through polarizing prism 4 and quarter wave plate 6 to condenser lens 5, whereby three parallel light rays are condensed as three light spots on the recording medium of optical disk 7.

For purposes of explanation, the reflecting surface of polarizing prism 4 is illustrated as an inclined reflecting plane defined by points c, e, f and e. It is to be understood, however, that the actual reflecting surface of prism 4 is defined by a first surface including points b, d, g and e, or by a second surface including points a, c, h, and f.

The three beams incident on optical disk are reflected from the spots where they are incident. Thereby, three reflected beams are applied via condenser lens 5, end quarter wave plate 6 to polarizing prism 4. The reflected beams are further reflected at the reflecting surface of prism 4 defined by points c, d, f and e so that the beams propagate from one side (illustrated as the right side in FIG. 1) of polarizing prism 4. Interference filter 8 is disposed in a light path of a center light beam CB of the three light beams reflected from disk 7 and the internal reflecting surface of prism 4. Interference filter 8 is a multiple beam interference filter of the transmission type. Center beam CB assists in deriving a focusing error signal Se and a signal Sf indicative of information recorded on disk 7. Beams AB and BB, located on opposite sides of center beam CB, are used to derive a tracking error signal as described infra.

Transmission type interference filter 8 is disposed in such a manner that the beam transmitted through it has an intensity between certain maximum and minimum values. Interference filter 8 is disposed so that it is inclined with respect to the optical axis of center beam CB. Thus, the normal surface of interference filter 8 makes a predetermined angle, $\theta$, with respect to the optical axis illustrated in FIG. 3, a partial top plan view of interference filter 8.

Optical detector or photo sensor 9 is positioned to receive light beams AB, BB, and CB, reflected by prism 4. Detector 9 is of a composite type, having upper and lower sections 9c and 9d, as well as left and right sections 9a and 9b, located in a central region between upper and lower sections 9c and 9d. Each of sections 9a–9d of detector 9 comprises a photosensitive element. A boundary 1 running longitudinally along the center of detector 9 separates the central left and right sections 9a and 9b. Detector 9 is located such that boundary 1 is perpendicular to optical axis OA of center beam CB. Further, boundary 1 is perpendicular to a plane including the optical axis OA and the normal of interference filter 8 extending from a point through which the optical axis passes. The plane including the optical axis and the normal is perpendicular to the surface of interference filter 8.

In FIG. 2 is illustrated the light intensity versus phase difference characteristic response of interference filter 8. From FIG. 2, it is seen that the interference filter has a narrow band pass characteristic such that maximum light is passed by the interference filter for phase differences of $\pi n$, where n is an odd integer.

The operation of interference filter 8 is described with reference to FIG. 3, a partial top plan view of the interference filter. Interference filter 8 is illustrated in FIG. 3 at a predetermined angle $\phi_0$ with respect to optical axis OA of center beam CB. In the illustrated situation, an optical path difference $\Delta$ and a wave phase difference $\theta$ within interference filter 8 occur in response to beam CB being incident on the interference filter in accordance with:

$$\Delta = 2d\sqrt{n_1^2 - n_0^2 \sin^2 \phi_0} \tag{1a}$$

$$\theta = \frac{2\pi\Delta}{\lambda} \tag{1b}$$

wherein
$\lambda$ is the wavelength of the incident light in beam CB;
d is the thickness of filter 8;

$n_1$ is the diffraction of filter 8;
$n_0$ is the refractive index of the medium outside filter 8.

The length of the optical path difference, $\Delta$, which occurs as a result of plural reflections within the system, varies as a function of the number of such reflections. The optical path difference $\Delta$ given by Equation 2a (infra) causes the transmitted light intensity to be maximized. In contrast, when the optical path difference, $\Delta$, is given by Equation 2b, the transmitted light has minimum intensity.

$$\Delta = P\lambda \quad (2a)$$

$$\Delta = (P + 1/N)\lambda \quad (2b)$$

wherein
P is 1, 2, 3 ...; and
N is the number of reflections in filter 8.

The relationships indicated by Equations 2a and 2b are illustrated in FIG. 2.

From the foregoing, if interference filter 8 is set so that the angle of incidence of beam OA on the interference filter is equal to $\pi$, the light transmitted through the interference filter has a maximum value. However, when the angle of incidence is less than the value which provides maximum light transmission, the transmitted light can reach the maximum value by changing the phase difference $\theta$, as understood from FIG. 2. Because of the coherent nature of the light derived from semiconductor laser source 1, if the incident angle $\phi_0$ is set so that the phase difference $\theta$ is set to $\theta_1$, which is slightly less than $\pi$, the intensity t of the light transmitted through filter 8 varies drastically.

Interference filter 8 is inclined in FIG. 1 with respect to optical axis OA so that a desired phase difference $\theta$, such as $\theta_1$, is initially set. To this end, interference filter 8 is rotated in the direction of arrow A, FIG. 1, to be set at a desired inclined position.

Figures 6A, 6B:
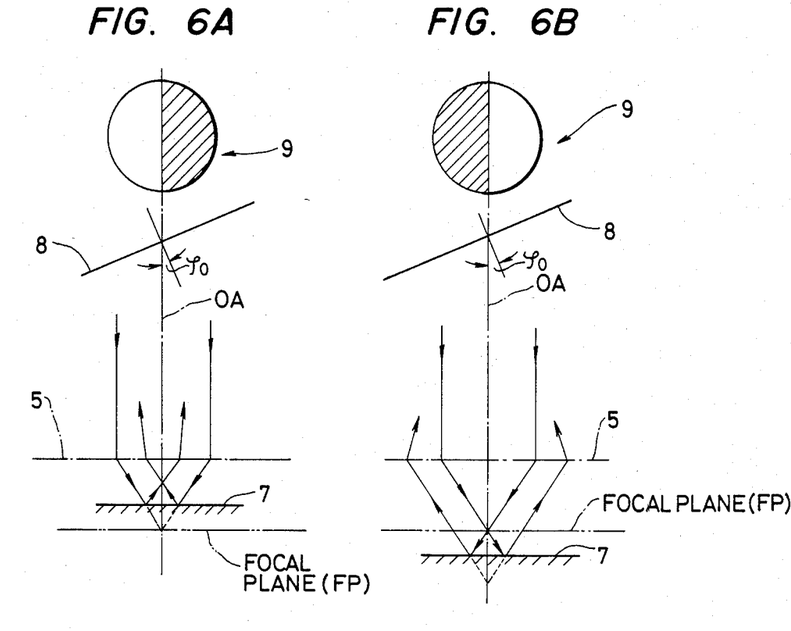
FIGS. 6A and 6B are explanatory diagrams for the response when an optical disk is positioned in a plane which deviates from the focal plane of the optical system of FIG. 1.

FIGS. 6A and 6B are schematic illustrations of optical filter 8 and optical detector 9 for the distance between condenser lens 5 and optical disk 7 being respectively smaller and greater than a predetermined distance where the light from laser light source 1 converges on the surface of optical disk 7 to form a light spot. In FIGS. 6A and 6B are respectively illustrated the situations for focal plane FP being beyond and in front of disk surface 7 relative to condenser lens 5.

When the distance between condenser lens 5 and disk 7 is less than the predetermined distance, FIG. 6A, the reflected light from disk 7 is diffused after passing through condenser lens 5. Because the diffused rays are incident on interference filter 8, after having been reflected by polarizing prism 4, the incident angle on the left and right sides of interference filter 8 are respectively less than and greater than $\phi_0$. The left and right sides of interference filter 8 are the portions of the filter bisected by a center line perpendicular to optical axis OA and parallel to the plane of filter 8.

Because of this relationship, the phase differences of the reflected light from the left and right halves of filter 8 are respectively greater and less than $\theta_1$, as is apparent from Equations 1a and 1b. In consequence, the intensity of light transmitted through the left and right halves of interference filter 8 are respectively greater and less than the value of "t", FIG. 4.

If disk 7 is located at a position such that the distance between condenser lens 5 and disk 7 is greater than the predetermine distance between lens 5 and focal plane FP, the light reflected by disk 7 converges after passing through condenser lens 5. Because the converging rays are incident on interference filter 8 after having been reflected by polarizing prism 4, the incident angles on the left and right sides of interference filter are respectively greater and less than $\phi_0$. Therefore, the phase differences of the reflected light incident on the left and right sides of filter 8 are respectively less than and greater than $\theta_1$. The intensity of the transmitted light through the left and right halves of interference filter 8 is therefore respectively less than and greater than "t".

For the embodiment of FIG. 1, the reflected rays from disk 7 are parallel as they pass through condenser lens 5 if disk 7 is positioned in focal plane PL. This is because the rays incident on condenser lens 5 from quarter wave plate 6 are parallel rays. Because the rays incident on lens 5 are parallel, i.e., collimated, the angle of incidence of these rays on interference filter 8 is $\phi_0$ across the entire surface of the filter. Thereby, the intensity of light transmitted through interference filter 8 is equal to the value of "t", FIG. 4, for disk 7 positioned at focal plane PL.

The light transmitted through interference 8 is incident on and received by photosensitive elements 9a and 9b of optical detector 9. Because boundary 1 between elements 9a and 9b is aligned with optical axis OA, the intensity of the light incident on photosensitive elements 9a and 9b is identical if disk 7 is positioned in focal plane PL. Accordingly, the amplitudes of the output signals of photo elements 9a and 9b are equal.

If, however, disk 7 deviates from focal plane PL, different light intensities are incident on photosensitive elements 9a and 9b, with the difference being a function of the amount disk 7 deviates from focal plane FP. In consequence, different output signals are derived from photosensitive elements 9a and 9b; the magnitude and polarity of the difference is indicative of the position of disk 7 relative to the focal plane.

Thereby, a difference signal having a magnitude indicative of the deviation of the light intensity incident on photosensitive elements 9a and 9b indicates the amount of error in the position of disk 7 relative to the focal plane and is used to control a feedback network. The feedback network controls the position of condenser lens 5 relative to disk 7 to minimize the magnitude of the error signal. Such a feedback control system enables a light spot having a predetermined small diameter to be continuously focused on optical disk 7. The output signals of photosensitive elements 9a and 9b are added to each other to provide a signal indicative of the information on the read track of disk 7.

In one embodiment, interference filter 8 is an etalon filter which has several advantages. The half-width of light transmitted through an etalon filter can be very small, less than several hundreds of Angstroms. An etalon filter has a steep slope in the phase difference versus transmitted light intensity characteristic for a half-width phase, particularly for a light source having a wavelength of approximately 7,000 Angstroms.

Because the incident angle $\phi_0$ of light ray OA on interference filter 8 is set on the steep slope of the phase difference versus transmitted light intensity characteristic curve of FIG. 2, the transmitted light intensity drastically changes in response to a slight change in the incident angle of the light incident on filter 8. In particular, the amplitude of each of the output signals from photosensitive elements 9a and 9b changes drastically, whereby a focusing error signal has a sharp characteristic.

For example, when condenser lens 5 has a numerical aperture between 0.4 and 0.65, there is a phase difference as much as $\pm\pi$ for a focusing error as small as $\pm 1$ micrometer. However, the resolving error for focusing error detection does not have to be this great. On the other hand, in some cases a wide dynamic range is required, so it is preferable to employ a system having a gentler characteristic curve, indicated by curve b, FIG. 2, rather than a curve having a steep characteristic curve, such as curve a, FIG. 2.

Conventional techniques enable an interference filter having a desired slope in the phase difference versus transmitted light intensity characteristic to be easily designed and manufactured.

While the left side slope in the phase difference versus transmitted light intensity characteristic curve was described in connection with FIGS. 1 and 4, it is to be understood that the right side slope may also be used. A blue dichroic mirror may be used as interference filter 8, in which case the transmitted wavelength characteristic thereof is employed. In such a situation, the wavelength of the filter is adjusted so that it is coincident with the wavelength of source 1.

In the system of FIG. 1, the optical axis is not bent because interference filter 8 is of the transmitting type. Therefore, designing and adjustment of the optical system including such a filter are readily performed. When it is convenient to use an optical system having a bent axis, the interference filter 8 of FIG. 1 may be replaced with a reflecting interference filter.

Figure 7:
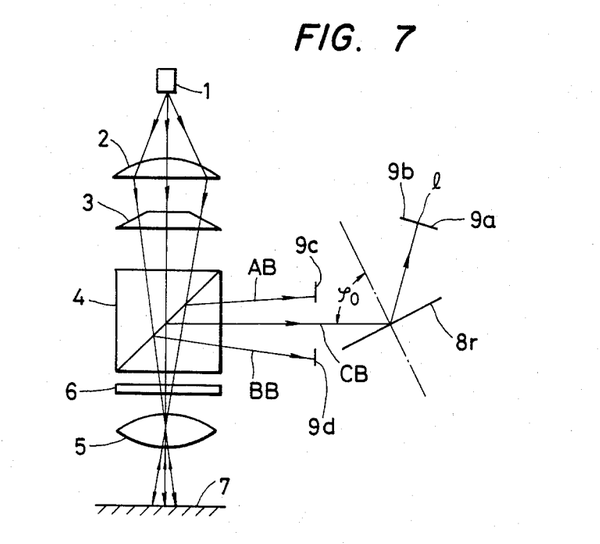
FIG. 7 is a schematic diagram of another embodiment of an optical system according to the present invention.

FIG. 7, an illustration of another embodiment of the invention, includes reflecting interference filter 8r, having an axis displaced from the beam axis by an angle $\phi_0$. Light reflected from reflecting interference filter 8r is incident on photosenstive elements 9a and 9b of optical detector 9.

In the described embodiments of FIGS. 1 and 7, beams AB and BB are located on opposite sides of center beam CB and are symmetrically incident on optical disk 9 to form light spots on opposite sides of a center spot on which center beam CB is incident. Beams AB and BB are also reflected from disk 7 so that the reflected beams are used for tracking control. The reflected beams AB and BB are detected by photosensitive elements 9c and 9d of optical detector 9 to enable the tracking control signal to be derived. In the FIG. 1 embodiment, photosensitive elements 9c and 9d are located on opposite sides of photosensitive elements 9a and 9b, as described supra. In the embodiment of FIG. 7, photosensitive elements 9c and 9d are located independently of photosensitive elements 9a and 9b, whereby elements 9c and 9d of FIG. 7 are positioned to be responsive directly to beams AB and BB as reflected by polarizing prism 4.

It is to be understood that trapezoidal prism 3 can be located in the embodiments of FIG. 1 and 7 between light source 1 and collimating lens 2, instead of between lens 2 and prism 4, as illustrated. Such an arrangement allows trapezoidal prism 3 to be reduced in size.

If desired, a diffraction grating may be used instead of trapezoidal prism 3 to form the three beams.

A correctly produced optical disk has a flat track information bearing surface. However, the disk is apt to warp or bend when it is used for long periods of time or when the disk is stored in an undesirable manner. Such warping causes the plane of the disk to include an inclined portion, whereby the optical axis of light reflected from such an inclined surface is inclined with respect to the optical axis of the incident light.

Because the intensity of a cross-section of the incident light exhibits Gaussian distribution the center of the intensity distribution of the reflected light from an inclined disk plane deviates from the optical axis of the incident light even if condenser lens 5 is correctly positioned. The optical axes of the incident and reflected light relative to an inclined plane of disk 7 thus deviate from each other. Thereby, light reflected from an incline plane of disk 7 crosses photosensitive elements 9a and 9b of optical detector 9 to derive false signal components having no relationship to a true focusing error. The false focusing error signal components deteriorate the focusing control to reduce the performance of the information reproducing apparatus.

Because the focusing error signal in the embodiments of FIGS. 1 and 7 is derived by detecting variations in the intensity of light passing through or reflected from interference filter 8 or 8r with the interference filter set at a specific angle with respect to the optical axis, the false focusing error signal causes a substantial problem. To resolve this problem, an interference filter having a low resolving power is used. However, a low resolving power filter deteriorates the focusing control system performance. Thereby, it is not advisable to utilize such an interference filter.

Figure 8:
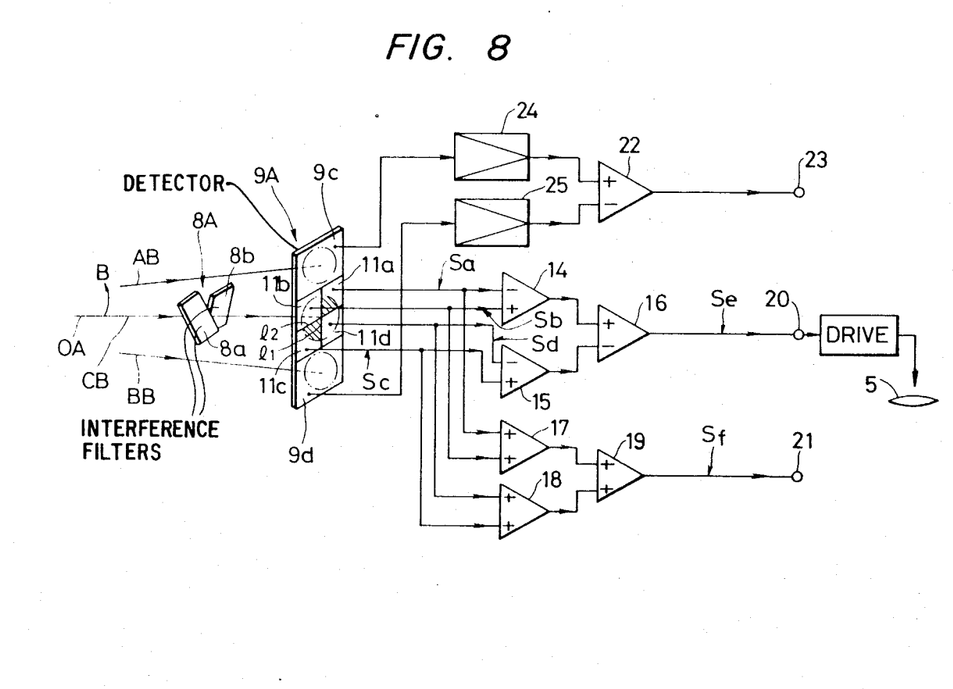
FIG. 8 is a schematic diagram of still another embodiment of the optical system of the invention and associated detecting circuitry.

In accordance with the embodiment of FIG. 8, the false focusing error signal problem is obviated with a system having a relatively high resolving power. In FIG. 8 is illustrated a partial view of the entire optical system and associated electronic circuit. The entire optical system of the FIG. 8 embodiment actually comprises elements 1–6 of FIG. 1, in addition to the elements specifically illustrated in FIG. 8.

Interference filter 8A includes portions 8a and 8b, divided by a plane including beams AB, BB, and CB, as reflected internally by polarizing prism 4. Filter portions 8a and 8b are inclined in opposite directions by predetermined equal angles with respect to optical axis OA of the center light beam CB. In FIG. 8, portions 8a and 8b are respectively inclined by angles of $+\phi_0$ and $-\phi_0$ with respect to optical axis OA. Angles $+\phi_0$ and $-\phi_0$ are respectively set so that the phase difference of light passing through interference filter 8A is equal to $\theta_1$, FIG. 4, when the light incident on interference filter 8A is parallel to axis OA in the same manner as described with reference to FIGS. 3 and 4.

In the FIG. 8 embodiment, optical detector 9A includes four centrally positioned photosensitive elements 11a, 11b, 11c and 11d, as well as side photosensitive elements 9c and 9d. Thus, photosensitive elements 9a and 9b, FIG. 1, are replaced by four photosensitive elements 11a–11d. Elements 11a–11d are positioned to form a four-quadrant array, wherein each quadrant is separated by mutually orthogonal dividing lines $l_1$ and $l_2$. The intersection of lines $l_1$ and $l_2$ is located on the optical axis of center beam CB, causing beam CB to illuminate photosensitive elements 11a–11d when the light rays incident on and reflected from disk 7 are coincident.

In the embodiment illustrated in FIG. 8, side beams AB and BB are directly applied to photosensitive elements 9c and 9d without passing through interference filter 8A. It is to be understood, however, that the first and second portions 8a and 8b of interference filter 8A may be respectively extended in the longitudinal directions thereof if structural circumstances permit, whereby both side beams AB and BB also pass through interference filter 8A.

The electric circuit responsive to output signals derived by photosensitive elements of optical detector 9A includes operational amplifiers 14–19 and 22, as well as amplifiers 24 and 25. Each operational amplifier includes two input terminals to provide addition or subtraction of the two input signals thereof. The output signals of photosensitive elements 11a–11d are respectively supplied to operational amplifiers 14–19. Amplifier 14 includes positive and negative input terminals respectively responsive to the signals derived from photosensitive elements 11b and 11a to derive a signal indicative of the difference thereof. Operational amplifier 15 has positive and negative input terminals respectively responsive to signals derived from photosensitive elements 11c and 11d to derive an output signal representing the difference of the light intensities incident on these photosensitive elements. The difference representing output signals of operational amplifiers 14 and 15 are respectively applied to positive and negative input terminals of amplifier 16, which derives output signal Se, a composite error signal which is applied to output terminal 20.

Operational amplifiers 17 and 18 have positive input terminals respectively coupled to photosensitive elements 11a, 11b and 11c, 11d. The summation representing output signals of amplifiers 17 and 18 are applied to positive input terminals of operational amplifier 19, which derives an output signal Sf, indicative of the total intensity of the optical energy incident on elements 11a–11d.

The output signal Se is the focusing error signal, while signal Sf supplied by amplifier 19 to terminal 21 has a magnitude indicative of the information on the track being read. The magnitude of the error signal Se is related to the magnitudes of the optical energy incident on photosensitive elements 11a–11d in accordance with:

$$Se = (S_b - S_a) - (S_c - S_d) \quad (3a)$$
$$= (S_b + S_d) - (S_a + S_c)$$

where $S_a$, $S_b$, $S_c$ and $S_d$ are respectively indicative of the amplitudes of the optical energies incident on photosensitive elements 11a, 11b, 11c and 11d. Similarly, the amplitude of the summation signals supplied by amplifier 19 to terminal 21 is represented by:

$$Sf = S_a + S_b + S_c + S_d \quad (3b)$$

The operation of the embodiment of FIG. 8 is now described in detail. Initially assume that optical disk 7 is positioned closer to condenser lens 5 than to focal plane FP, as described in connection with FIG. 6A. In such a situation, the rays incident on interference filter 8A, FIG. 8 are diffused. Therefore, the angle of incidence of the light falling on filter 8A differs from the angle of incidence of parallel rays falling on the filter. The angle of incidence of the light falling on filter 8A is greater than the angle of incidence of the parallel rays for the light passed by the filter to photosensitive elements 11a and 11c. In contrast, the angle of incidence of the light falling on filter 8A, which is passed by the filter to photosensitive elements 11b and 11d, is less than the incident angle of the parallel rays.

In consequence, the incident light on the first and third quadrant photosensitive elements 11a and 11c has a smaller intensity than the value of t, FIG. 4; the incident light on the second and fourth quadrant photosensitive elements 11b and 11d has an intensity greater than the value of t. Accordingly, the focusing error signal Se at terminal 20, FIG. 8, has a positive polarity in this situation. If disk 7 is positioned beyond focal plane FP, as shown in FIG. 6B, the reflected light passed through condenser lens 5 converges, causing the focusing error Se to have a negative polarity.

The signals derived by photosensitive elements 9c and 9d, positioned at opposite ends of optical detectors 9 and 9A, FIGS. 1 and 8, are respectively fed to amplifiers 24 and 25. Output signals from amplifiers 24 and 25 are respectively supplied to positive and negative input terminals of differential operational amplifier 22 which derives a difference signal which is used as a tracking control signal; the tracking control signal is supplied by amplifier 22 to output terminal 23.

Assume that center beam CB internally reflected by polarizing prism 4, FIG. 1, is inclined in the direction of arrow B, FIG. 8. In such a situation, the optical axis of center beam CB is incident on interference filter 8A at a point shifted toward photosensitive element 9c from the intersection between dividing lines $l_1$ and $l_2$. Because of the shift or deviation of optical axis OA of center beam CB the magnitude of the output signals $S_a$ and $S_b$ derived from photosensitive elements 11a and 11b increases relative to the amplitudes of the output signals $S_c$ and $S_d$, as derived from photosensitive elements 11c and 11d. The magnitude variation in the output signals $S_a$, $S_b$, $S_c$ and $S_d$ does not cause a change in the magnitude of focusing error signal Se, as can be seen from an inspection of Equation 3a. Thereby, the deviation in the optical axis of the light incident on interference filter 8A does not cause any undesirable influence on focusing error signal Se.

From the above, it is understood that the embodiment of FIG. 8 resolves the problem caused by inclinations in the plane of disk 7. Therefore, the false focusing error signal is not produced. In addition, if both side beams AB and BB pass through interference filter 8A, the inclination of the optical axes of side beams AB and BB does not produce any undesirable effect on the tracking error signal. In particular, because interference filter 8A has oppositely inclined portions 8a and 8b, there are increases and decreases in the intensity such that no changes result in the total derived signals Se and Sf. The output signals from photosensitive elements 9c and 9d are not changed by oppositely inclining portions 8a and 8b of filter 8A.

Even if the optical axis OA of center beam CB is inclined in the direction of arrow B, FIG. 8, the focusing error signal Se magnitude does not change because the angles of incidence on portions 8a and 8b of filter 8A vary in the same direction, causing the output signal levels of the first and fourth quadrant photosensors 11a and 11d to increase and decrease equally. In contrast, the magnitude of the reproduced information signal Sf at terminal 21 changes because of the inclination of optical axis OA of center beam CB. However, the variation in magnitude in the reproduced information signal does not cause a serious problem in practical use when the information is recorded on disk 7 as an FM or pulse code modulated signal, as is frequently the case.

Stable reproduction occurs because undesirable influences due to the inclination of the optical axis of center beam CB do not affect the magnitude of focusing error signal Se. In addition, the inclination of the optical axis does not adversely affect the tracking error signals respectively developed at output terminals 20 and 23.

In the previously described embodiments, the light emitted from semiconductor laser light source 1 is collimated by lens 2 prior to being divided into three beams by trapezoidal prism 3, so that the three beams are respectively condensed by lens 2 to form three spaced light spots on the surface of disk 7. In particular, the combination of collimating lens 2 and condenser lens 5 functions as a compound lens. To image a light spot having a diameter of approximately 1 micrometer, such a compound lens must have satisfactory resolving power. The compound lens can operate in an optimum manner if collimating lens 2 and condensing lens 5 are both fixed. However, lenses 2 and 5 move relative to each other in the radial directions thereof, i.e., a direction normal to the tangent of the information track recorded on disk 7, during tracking control. Therefore, it is difficult to operate the compound lens in an optimum manner.

To improve the operating condition of the optical system so that desirable resolving power is assured, collimating lens 2 may be omitted and the diffused light from semiconductor laser light source 1 can be applied to condenser lens 5 without collimation.

Figure 9A:
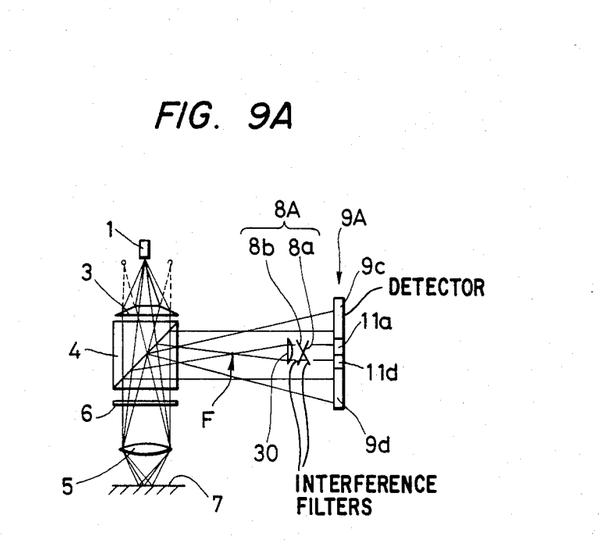
FIGS. 9A and 9B are schematic diagrams of still further embodiments of the optical system of the present invention.
Figure 9B:
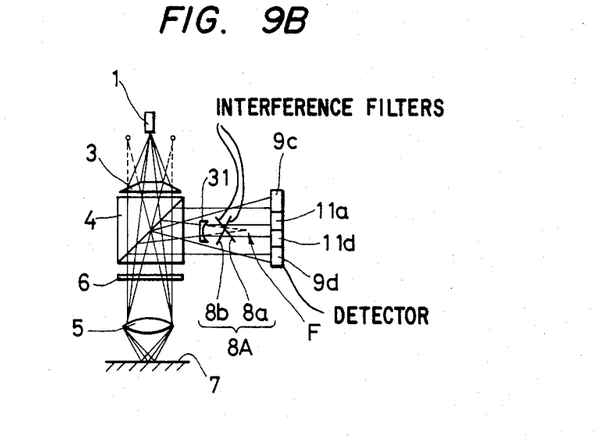

In FIGS. 9A and 9B are illustrated further embodiments wherein no collimating lens is employed between light source 1 and condenser lens 5. In the embodiment of FIG. 9A, convex lens 30 is positioned in the light path between polarizing filter 4 and interference filter 8A, corresponding substantially to filter 8A in the embodiment of FIG. 8. In the embodiment of FIG. 9B, concave lens 31 replaces convex lens 30, FIG. 9A. In the embodiments of FIGS. 9A and 9B, the position of focal point F of concave lens 31 is matched with a conjugate point of light source 1. Convex lens 30 or the concave lens 31 collimates the diffused, reflected light from the disk 7, as passed by condenser lens 5. Therefore collimated light rays are incident on interference filter 8A, whereby the embodiments of FIGS. 9A and 9B operate in the same manner as the embodiment of FIG. 8.

The embodiment of FIG. 9B has the advantage of the entire optical system being relatively small; in particular, optical detector 9A can be made very small, as illustrated. Trapezoidal prism 3 can have a relatively small size because it can be located at a position where the light beam from semiconductor laser light source 1 is narrow. Furthermore, the three beams passed by trapezoidal prism 3 are distributed into a smaller space than in the embodiments of FIGS. 1 and 8. Thereby, the effective diameter of a hollow supporting cylinder (not shown) for polarizing prism 4, quarter wave plate 6 and condenser lens 5 is relative small. The transmission type interference filter 8A in the embodiments of FIGS. 9A and 9B can be replaced by a reflecting filter 8r, as illustrated in FIG. 7.

While the previously described embodiments operate satisfactorily with various problems inherent to the conventional systems being solved, these embodiments have the problem of the average intensity of the light transmitted through filters 8 and 8A being reduced by 3dB. If the interference filters are of a type including a metallic thin film, the average intensity of the transmitted light is further reduced by 6dB due to reflection by the thin film. The resulting attenuation by the interference filter causes a deterioration in the signal to noise ratio of the transmitted signal.

The embodiment of FIG. 1 additionally suffers from a false focusing error signal, as described above. The embodiment of FIG. 8 suffers from a deteriorated signal to noise ratio in the focusing error signal due to random reflection and diffraction of light incident on border portions 8a and 8b of interference filter 8A.

Figure 10:
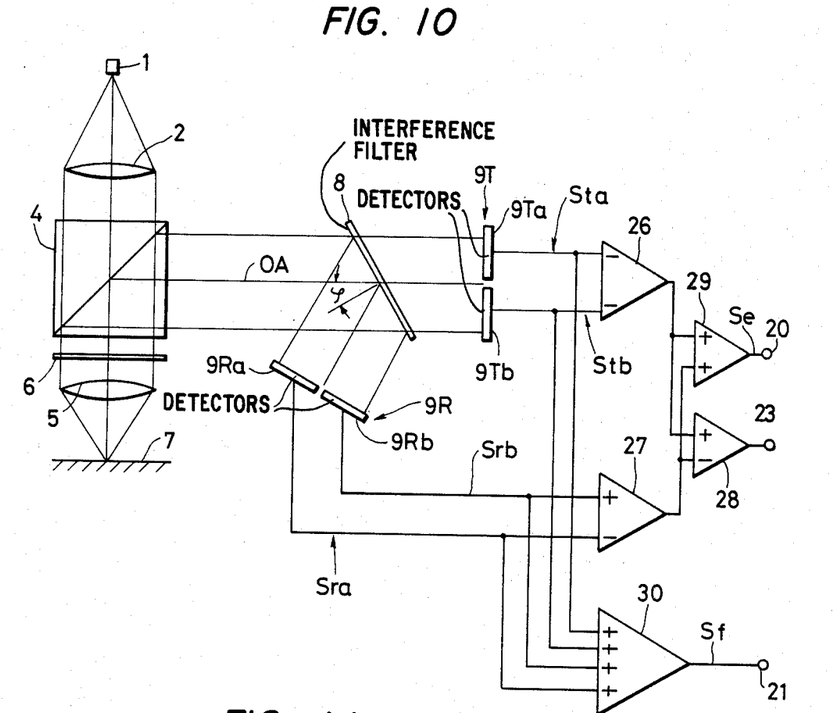
FIG. 10 is a schematic diagram of yet a further embodiment of the invention, in combination with detecting circuitry associated therewith.

The embodiment illustrated in FIG. 10 removes the previously mentioned problems. In the embodiment of FIG. 10, a single light beam from light source 1 is processed so three signals are derived, viz: a reproduced information signal, a focusing error signal, and a tracking error signal. Therefore, only a single light spot is incident on optical disk 7 from light source 1. The embodiment of FIG. 10 differs from the previously described embodiments because optical detector 9 or 9A, FIGS. 1 and 8, is separated into a pair of sections, each having two photosensitive elements. In particular, first and second optical detectors 9T and 9R are provided, with detector 9T including first and second photosensitive elements 9Ta and 9Tb; detector 9R includes photosensitive elements 9Ra and 9Rb.

Optical detector 9T is positioned so that light transmitted through interference filter 8, disposed in the same manner described in connection with the embodiment of FIG. 1, is incident thereon. Detector 9R is positioned to be responsive to light reflected from interference filter 8. Photosensitive elements 9Ta and 9Tb are positioned in side by side relationship, with a dividing line corresponding to the boundary between elements 9Ta and 9Tb being perpendicular to optical axis OA. Photosensitive elements 9Ra and 9Rb are positioned in side by side relationship to each other, with a dividing line corresponding to the boundary between elements 9Ra and 9Rb being perpendicular to a plane including optical axis OA. A line normal to the plane of interference filter 8 extends from the intersection of optical axis OA.

In FIG. 10 is illustrated an electronic circuit responsive to the output signals of photosensitive elements 9Ta, 9Tb, 9Ra and 9Rb. The electronic circuit includes differential operational amplifiers 26 and 27. Operational amplifier 26 includes positive and negative input terminals respectively responsive to the signals derived by photosensitive elements 9Ta and 9Tb, while differential amplifier 27 includes positive and negative input terminals respectively responsive to signals derived from photosensitive elements 9Rb and 9Ra. Differential output signals of amplifiers 26 and 27 are combined in differential amplifier 28 and additive operational amplifier 29. The output signals of elements 9Ta, 9Tb, 9Ra, and 9Rb are additively combined in adder 30. Output signals of amplifiers 29, 28 and 30 are respectively applied to terminals 20, 23 and 21 from which are derived focusing error signal Se, the tracking error signal and the reproduced information signal Sf.

The operation of the embodiment of FIG. 10 to produce the three output signals is described in connection with the explanatory diagram of FIG. 11, an enlarged top plan view of interference filter 8, FIG. 10. The light incident on filter 8 is reflected several times inside the filter from opposite faces of the filter so that the filter produces transmitted and reflected light beams. The optical path difference $\Delta$ and the phase difference $\theta$ between the light incident on and transmitted from filter 8 is represented by Equation 4, which is derived from Equations 1a and 1b, so it is:

$$\theta = \frac{4\pi d}{\lambda} \sqrt{n_1^2 - n_0^2 \sin^2 \phi} \quad (4)$$

wherein the nomenclature of Equation 4 is the same as in Equations 1a and 1b.

The intensity of the light transmitted from and reflected by filter 8 varies as a function of the phase difference $\theta$ as shown by the following table.

| PHASE DIFFERENCE $\theta$ | INTENSITY OF TRANSMITTED LIGHT | INTENSITY OF REFLECTED LIGHT |
| --- | --- | --- |
| $2\pi P$ | MAXIMUM | MINIMUM |
| $1\pi(P + 1/N)$ | MINIMUM | MAXIMUM | where
P is selectively 0, 1, 2, 3 ...;
N is the number of reflections in filter 8 which contribute to the interference.

From the above table, the intensity of the transmitted light varies as an inverse function, i.e., has a complementary characteristic with respect to the manner in which the reflected light intensity changes.

Figure 12:
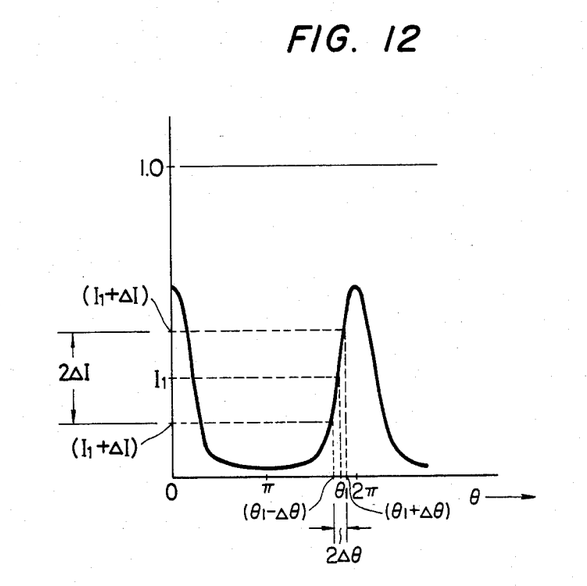
FIG. 12 is a graphical representation of intensity versus phase angle for an interference filter used in the system of FIG. 10.

This point is described further with reference to FIG. 12, a diagram of the phase difference versus transmittance characteristic of interference filter 8. For an inclination angle $\phi$ of interference filter 8, as determined in accordance with Equation 4, such that the phase difference $\theta_1$ between the light incident on the filter and the light transmitted by the filter corresponds to a point on the steep slope of the characteristic curve of FIG. 12, the transmitted light intensity is represented by $I_1$. The intensity of the reflected light under the same condition is represented by $I_1 - \Delta I$. Because the intensity of the light transmitted through interference filter 8 is determined by Equation 4 as a function of the phase difference, $\theta$, between the light incident on and transmitted by filter 8, and because the intensity of the reflected light is represented by the difference in the intensity of the incident light minus the intensity of the transmitted light, the reflected light intensity varies in an opposite direction to the transmitted light intensity variation, with respect to the phase difference $\theta$.

Figure 13A:
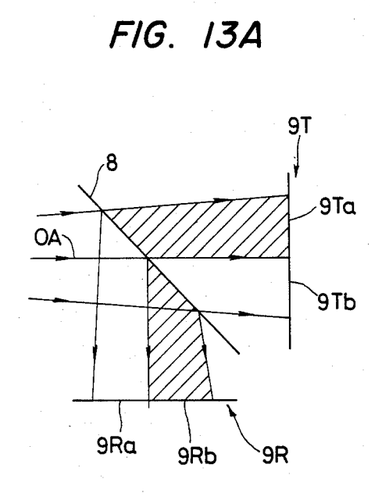
FIGS. 13A and 13B are diagrams useful in explaining how the system of FIG. 10 provides for focusing for an optical disk positioned in a plane different from the focal plane.
Figure 13B:
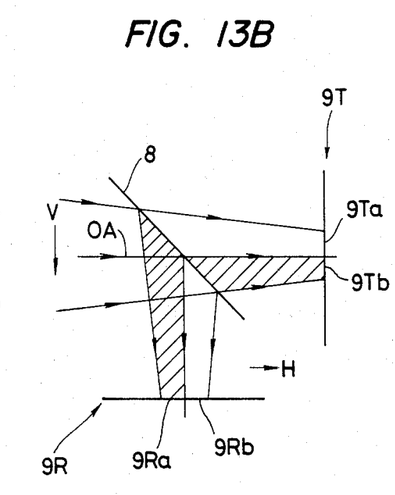

Reference is now made to FIGS. 13A and 13B, explanatory diagrams of the operation of interference filter 8 under the conditions of optical disk 7 being positioned respectively closer to and farther away from condenser lens 7 than focal plane FP. The conditions illustrated in FIGS. 13A and 13B respectively correspond to those illustrated in FIGS. 6A and 6B. Thereby, the light rays transmitted through condenser lens 5 are diffused rays for the situation illustrated in FIG. 13A and the reflected rays propagating through condenser lens 5 are converging, in the case of FIG. 13B.

In FIG. 13B, the angle of light incident on the upper and lower halves of filter 8 (i.e., the halves of the filter respectively above and below optical axis OA), is greater and less than the angle of incidence of parallel rays, respectively. The increases and decreases in the incident angle on the upper and lower portions of intereference filter 8 are symmetrical with respect to a line of symmetry corresponding to optical axis OA. Thereby, increases and decreases in average phase difference $\theta$ on the upper and lower halves are expressed by $+\Delta\theta$ and $-\Delta\theta$, respectively.

If disk 7 is located beyond focal plane FP, the intensities of light incident on photosensitive elements 9Ta and 9Tb are $(I_1 + \Delta I)$ and $(I_1 - \Delta I)$, respectively corresponding to $(\theta_1 + \Delta\theta)$ and $(\theta_1 - \Delta\theta)$, FIG. 12. The intensities of light incident on photosensitive elements 9Ra and 9Rb of optical detector 9R are respectively $[1 - (I_1 + \Delta I)]$ and $[1 - (I_1 - \Delta I)]$.

Assume that the output signals from photosensitive elements 9Ta, 9Tb, 9Ra and 9Rb are respectively Sta, Stb, Sra and Srb. The values of these terms can be combined in accordance with:

$$\{Sta - Stb + Srb - Sra\} \quad (5)$$

Substituting the values for Sta, Stb, Srb and Sra into Equation 5 yields:

$$(I_1 + \Delta I) - (I_1 - \Delta I) + [1 - (I_1 - \Delta I)] - [1 - (I_1 + \Delta I)] = 4\Delta I \quad (6)$$

An output signal corresponding to Equation 6 is derived if disk 7 is located beyond focal plane FP, whereby converging light rays are incident on interference filter 8, as shown in FIG. 13B. In contrast, if disk 7 is located in front of focal plane FP, diffuse light rays are incident on interference filter 8, causing the output signal of photosensitive elements 9Ta, 9Tb, 9Ra and 9Rb, when combined in accordance with Equation 5, to yield a result proportional to $-4\Delta I$.

Figure 11:
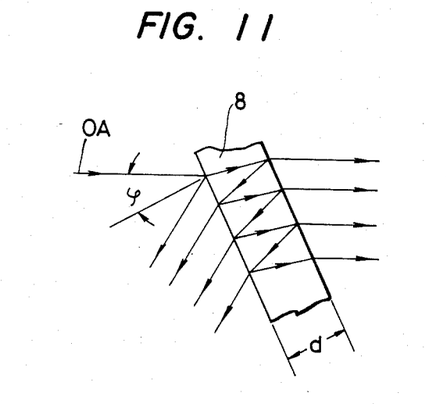
FIG. 11 is a diagram useful in explaining the operation of an interference filter used in the embodiment of FIG. 10.

Subtractors 26 and 27, in combination with adder 29, FIG. 11, are connected so that the output signals of photosensitive elements 9Ta, 9Tb, 9Ra and 9Rb are combined in accordance with Equation 6. Thereby, the output signal Se derived from the output of adder 29 and supplied to terminal 26 is the focusing error signal. In particular, the operation performed by subtractors 26 and 27, in combination with adder 29 is expressed by:

$$SE = (Sta - Stb) + (Stb - Sta)$$

From the above, it is understood that the focusing error of the optical system illustrated in FIG. 7 is detected with high accuracy and sensitivity by a combination of circuit elements arranged to perform the operation of Equation 5. In particular, the intensity of light incident on interference filter 8 varies in magnitude in an opposite manner on the top and bottom halves of the filter. The intensity of light transmitted through interference filter 8 is opposite to the intensity variation of the reflected light.

Output signals Sta, Stb, Sra, and Srb, derived from photosensitive elements 9Ta, 9Tb, 9Ra and 9Rb, are added to each other in adder 30, to produce reproduced information signal Sf. Since the reproduced information signal Sf corresponding to the sum of the output signals Sta, Stb, Sra and Srb has a constant maximum level, the reproduced information signal Sf has a very high signal to noise ratio.

Now assume that optical disk is warped so that the plane of disk 7 is inclined with respect to the incident light optical axis. Under such a condition, the axis of light reflected from disk 7 is inclined with respect to optical axis OA of light incident on the disk. If disk 7 is inclined so the rays incident on interference filter 8 are rotated or moved in the direction of arrow V, FIG. 13, the illuminated area of photosensitive element 9Ta decreases; for rotation or movement of the rays in the opposite direction, the illuminated area on photosensitive element 9Ta increases. Furthermore, rays reflected from interference filter 8 move or rotate in the direction of arrow H as a result of rotation of the rays in the direction indicated by arrow V. Therefore, the illuminated area of photosensitive element 9Ra decreases; for the opposite situation, the illuminated area of photosensitive element 9Rb increases. Increases and decreases in the illuminated area cause the associated photosensitive elements to derive output signals of higher and lower amplitudes.

If optical detectors 9T and 9R are correctly positioned, the amount or distance of movement of light incident on optical detector 9T equals that of light incident on optical detector 9R. Consequently, there is no change in the output signal Se at terminal 29, as substitution into Equation 5 reveals. Moreoever, the sum of the output signals from photosensitive elements 9Ta, 9Tb, 9Ra and 9Rb at output terminal 21 does not change in response to such movement of light rays incident on filter 8. Consequently, focusing error signal Se and reproduced information signal Sf are not influenced by the inclination of the reflected ligh rays caused by warping of disk 7.

Inclination of light rays incident on interference filter 8 also causes the total amount of light incident on optical detector 9T to either increase or decrease. The amount of light incident on detector 9R increases and decreases by amounts corresponding to variations in the total intensity of light incident on optical detector 9T. Thereby, focusing error signal Se and reproduced information signal Sf do not change because the optical axis is inclined or other similar phenonomen.

Although photosensitive elements 9Ta, 9Tb, 9Ra and 9Rb are positioned in the preferred embodiment so that the dividing line or boundary between them is perpendicular to the tangent of the tracks of optical disk 7, it is to be understood that photosensitive elements 9Ta, 9Tb, 9Ra, and 9Rb can be positioned so they are parallel to the tangent of the tracks.

As described previously, the signal derived from output terminal 23 can be used as a tracking control signal, in a manner described infra. Assume that the disk tracking deviates from the correct tracking under the conditions shown in FIGS. 13A and 13B. Under either of these conditions, the intensity of light incident on photosensitive elements 9Ta, 9Tb, 9Ra, and 9Ra and the output signals of these photosensitive elements are expressed as:

$$9Ta \ldots I + \Delta I + \alpha \propto Sta \quad (7)$$

$$9Tb \ldots I - \Delta I - \alpha \propto Stb \quad (8)$$

$$9Ra \ldots 1 - (I + \Delta I) + \alpha \propto Sta \quad (9)$$

$$9Rb \ldots 1 - (I - \Delta I) - \alpha \propto Stb \quad (10)$$

where $\Delta I$ indicates the intensity variation of light incident on the elements.

From Equations 7-10, the focusing error signal Se, the tracking error signal, and the reproduced information signal are respectively $4\Delta I$; $4\alpha$, and 2.0.

From these expressions, deviations in tracking and focusing from the correct operation of the system does not undesirably influence the magnitudes of the focusing error signal, the tracking error signal and the reproduced information signal while there is no interference between these three signals. Accordingly, operation of the information reproducing system is accurately controlled in response to these signals.

Although the embodiment of FIG. 10 has been described in connection with a so-called single spot technique, wherein only one light spot is incident on disk 7 to derive three information signals, (i.e., a focusing error signal, a tracking error signal and the reproduced information signal), optical detectors 9T and 9R can be arranged to provide a so-called twin spot method wherein two additional light spots are incident on disk 7 to derive the tracking error signal, as in the embodiment of FIGS. 1 and 8.

The above-described embodiments are merely examples of the present invention and, therefore, it is apparent to those skilled in the art that many modifications and variations may be made without departing from the spirit and scope of the claims.

What is claimed is:

1. A device for feedback controlling focus of an optical system in an information recording and/or reproducing apparatus capable of recording and/or reproducing on and/or from information tracks of an optical disk, comprising:

(a) first means for simultaneously imaging first, second and third light spots on one of the information tracks of said optical disk, said first means having a light source and a condenser lens, the optical disk responding to the light spots imaged thereon so first, second and third reflected beams are derived thereby, the first, second and third reflected beams being directed through first, second and third optical paths, each having an optical axis;

(b) optical means in the second optical path responsive to the second reflected optical beam for modifying the intensity of the second optical beam to have an intensity that is a function of the degree of focusing of the second light spot on the information track;

(c) optical detector means responsive to the first and third beam and the modified second beam for deriving multiple signals indicative of the intensity of the second beam and of the positions of the first, second and third light spots relative to the information track;

(d) means responsive to the multiple signals for deriving a focusing error signal and a tracking error signal; and (e) means responsive to the focusing error signal for controlling the axial position of said condenser lens so as to image the second light spot on said one information track with a predetermined diameter.

2. A device for feedback controlling focus of an optical system in an information recording and/or reproducing apparatus capable of recording and/or reproducing on and/or from information tracks of an optical disk, comprising:

(a) first means for imaging a light spot on one of the information tracks of said optical disk, said first means having a light source and a condenser lens, the optical disk responding to the light spot imaged thereon so a reflected beam is derived thereby, the reflected beam being directed through an optical path having an optical axis;

(b) optical means in the optical path responsive to the reflected optical beam for modifying the intensity of the optical beam to have an intensity that is a function of the degree of focusing of the light spot on the information track;

(c) optical detector means responsive to the modified beam for deriving multiple signals indicative of the intensity of the beam as reflected from the information track and the position of the light spot relative to the information track;

(d) means responsive to the multiple signals for deriving a focusing error signal, and a tracking error signal; and (e) means responsive to the focusing error signal for controlling the axial position of said condenser lens so as to image the light spot on said one information track with a predetermined diameter.

3. The device of claim 2 wherein the optical modifying means includes an interference filter for transmitting some of the reflected beam to a first portion of the detector means and for reflecting some of the reflected beam to a second portion of the detector means.

4. A device for feedback controlling focus of an optical system in an information recording and/or reproducing apparatus capable of optically recording and/or reproducing on and/or from an optical disk, comprising:

(a) first means for imaging a light spot on said optical disk, said first means having a light source and a condenser lens, the optical disk responding to the light spot imaged thereon so reflected rays are derived thereby, the reflected rays being directed through an optical path having an optical axis;

(b) a reflecting interference filter in the optical path arranged to pass said reflected rays, said interference filter being inclined with respect to the optical axis of the optical path so that the intensity of the reflected rays transmitted through said interference filter has an intensity between maximum and minimum values therefor as a function of the degree of focusing of the light spot on the optical disk;

(c) a composite optical detector having first and second photosensitive elements disposed on opposite sides of a dividing line which is perpendicular to said optical axis and to a plane including said optical axis and the normal of said interference filter extending from a point where said optical axis intersects said interference filter;

(d) an operating circuit responsive to output signals from said first and second photosensitive elements for producing a focussing error signal indicative of the focussing error of said optical system; and (e) a driving circuit responsive to said focussing error signal for controlling the axial position of said condenser lens of said first means so as to image the light spot on said optical disk with a predetermined diameter.

5. A device for feedback controlling focus of an optical system in an information recording and/or reproducing apparatus capable of optically recording and/or reproducing on and/or from an optical disk, comprising:

(a) first means for imaging a light spot on said optical disk, said first means having a light source, a trapezoidal prism for forming three beams from rays emitted from said light source, and a condenser lens, the optical disk responding to the light spot imaged thereon so reflected rays are derived thereby, the reflected rays being directed through an optical path having an optical axis;

(b) an interference filter in the optical path arranged to pass said reflected rays, said interference filter being inclined with respect to the optical axis of the optical path so that the intensity of the reflected rays transmitted through said interference filter has an intensity between maximum and minimum values therefor as a function of the degree of focusing of the light spot on the optical disk;

(c) a composite optical detector having first and second photosensitive elements disposed on opposite sides of a dividing line which is perpendicular to said optical axis and to a plane including said optical axis and the normal of said interference filter extending from a point where said optical axis intersects said interference filter;

(d) an operating circuit responsive to output signals from said first and second photosensitive elements for producing a focussing error signal indicative of the focussing error of said optical system; and (e) a driving circuit responsive to said focussing error signal for controlling the axial position of said condenser lens of said first means so as to image the light spot on said optical disk with a predetermined diameter.

6. A device for feedback controlling focus of an optical system in an information recording and/or reproducing apparatus capable of optically recording and/or reproducing on and/or from an optical disk, comprising:

(a) first means for imaging a light spot on said optical disk, said first means having a light source and a condenser lens, the optical disk responding to the light spot imaged thereon so reflected rays are derived thereby, the reflected rays being directed through an optical path having an optical axis;

(b) an interference filter in the optical path arranged to pass said reflected rays, said interference filter being inclined with respect to the optical axis of the optical path so that the intensity of the reflected rays transmitted through said interference filter has an intensity between maximum and minimum values therefor as a function of the degree of focusing of the light spot on the optical disk;

(c) a composite optical detector having first and second photosensitive elements disposed on opposite sides of a dividing line which is perpendicular to said optical axis and to a plane including said optical axis and the normal of said interference filter extending from a point where said optical axis intersects said interference filter, the optical filter further including two photosensitive elements responsive to two beams among said three beams, said two beams being located at both sides of a center beam, for deriving a tracking control signal;

(d) an operating circuit responsive to output signals from said first and second photosensitive elements for producing a focussing error signal indicative of the focussing error of said optical system; and (e) a driving circuit responsive to said focussing error signal for controlling the axial position of said condenser lens of said first means so as to image the light spot on said optical disk with a predetermined diameter.

7. A device for feedback controlling focus of an optical system in an information recording and/or reproducing apparatus capable of recording and/or reproducing on and/or from information tracks of an optical disk, comprising:

(a) first means for simultaneously imaging a light spot on one of the information tracks of said optical disk, said first means having a light source and a condenser lens, the optical disk responding to the light spot imaged thereon so a reflected beam is derived thereby, the reflected beam being directed through an optical path having an optical axis;
(b) optical interference means in the optical path responsive to the reflected optical beam for modifying the intensity of the reflected optical beam to have an intensity that is a function of the degree of focusing of the light spot on the information track, the interference filter being positioned so that when the spot is correctly focused on the track the intensity of the reflected rays transmitted through the interference filter is at a predetermined value between the maximum and minimum values and there are substantial changes in intensity from the predetermined value when the spot is incorrectly focused on the track;
(c) optical detector means responsive to the modified beam for deriving multiple signals indicative of the intensity of the beam as reflected from the information track and the position of the light spot relative to the information track;
(d) means responsive to the multiple signals for deriving a focusing error signal and a tracking error signal; and
(e) means responsive to the focusing error signal for controlling the axial position of said condenser lens so as to image the light spot on said one information track with a predetermined diameter.

8. A device for feedback controlling focus of an optical system in an information recording and/or reproducing apparatus capable of optically recording and/or reproducing on and/or from an optical disk, comprising:
(a) first means for imaging a light spot on said optical disk, said first means having a light source and a condenser lens, the optical disk responding to the light spot imaged thereon so reflected rays are derived thereby, the reflected rays being directed through an optical path having an optical axis;
(b) an interference filter in the optical path arranged to pass said reflected rays with multiple interference, said interference filter being inclined with respect to the optical axis of the optical path so that the intensity of the reflected rays transmitted through said interference filter has an intensity between maximum and minimum values therefor as a function of the degree of focusing of the light spot on the optical disk;
(c) a composite optical detector having first and second photosensitive elements disposed on opposite sides of a dividing line which is perpendicular to said optical axis and to a plane including said optical axis and the normal of said interference filter extending from a point where said optical axis intersects said interference filter;
(d) an operating circuit responsive to output signals from said first and second photosensitive elements for producing a focussing error signal indicative of the focussing error of said optical system; and
(e) a driving circuit responsive to said focussing error signal for controlling the axial position of said condenser lens of said first means so as to image the light spot on said optical disk with a predetermined diameter.

9. The device of claim 8 wherein the interference filter is positioned so that when the spot is correctly focused on the track the intensity of the reflected rays transmitted through the interference filter is at a predetermined value between the maximum and minimum values and there are substantial changes in intensity from the predetermined value when the spot is incorrectly focused on the track.

10. A device for feedback controlling focus of an optical system in an information recording and/or reproducing apparatus capable of optically recording and/or reproducing on and/or from an optical disk, comprising:
(a) first means for imaging a light spot on said optical disk, said first means having a light source and a condenser lens, the optical disk responding to the light spot imaged thereon so reflected rays are derived thereby the reflected rays being directed through an optical path having an optical axis;
(b) an interference filter in the optical path arranged to pass said reflected rays, said interference filter having first and second portions respectively inclined in opposite directions with respect to the optical axis of the optical path so that the intensity of the reflected rays respectively transmitted through said first and second portions of said interference filter assumes a value which is between maximum and minimum values therefor as a function of the degree of focusing of the light spot on the optical disk, said first and second portions being positioned on opposite sides of said optical axis;
(c) a composite optical detector having first to fourth photosensitive elements respectively disposed at first through fourth quadrants defined by two dividing lines which are perpendicular to each other, said composite optical detector being positioned so that said optical axis intersects said composite optical detector at the intersection of said two dividing lines, said two dividing lines being perpendicular to said optical axis;
(d) an operating circuit responsive to output signals from said first through fourth photosensitive elements for producing a focussing error signal indicative of the focussing error of said optical system by detecting the difference between the sum of the output signals from the second and fourth quadrant photosensitive elements and the sum of the output signals from the first and third quadrant photosensitive elements; and
(e) a driving circuit responsive to said focussing error signal for controlling the axial position of said condenser lens of said first means so as to image the light spot on said optical disk with a predetermined diameter.

11. A device as claimed in claim 10, wherein said operating circuit comprises a first subtractor responsive to the output signals from the first and second quadrant photosensitive elements, a second subtractor responsive to the output signals from the third and fourth quadrant photosensitive elements, and a third subtractor responsive to the output signals from said first and second subtractors.

12. A device as claimed in claim 11, wherein said operating circuit further comprises a first adder responsive to the output signals from the first and second quadrant photosensitive elements, a second adder responsive to the output signals from the third and fourth quadrant photosensitive elements, and an adder responsive to the output signals from said first and second adders for producing a reproduced information signal.

13. A device for feedback controlling focus of an optical system in an information recording and/or reproducing apparatus capable of optically recording and/or reproducing on and/or from an optical disk, comprising:
   (a) first means for imaging a light spot on said optical disk, said first means having a light source and a condenser lens, the optical disk responding to the light spot imaged thereon so reflected rays are derived thereby, the reflected rays being directed through an optical path having an optical axis;
   (b) an interference filter in the optical path arranged to pass said reflected rays, said interference filter being inclined with respect to the optical axis of the optical path so that the intensity of the reflected rays transmitted through said interference filter has an intensity between maximum and minimum values therefor as a function of the degree of focusing of the light spot on the optical disk;
   (c) a first composite optical detector having first and second photosensitive elements disposed on opposite sides of a dividing line which is perpendicular to said optical axis and to a plane including said optical axis and the normal of said interference filter extending from a point where said optical axis intersects said interference filter, said first composite optical detector being responsive to light transmitted through said interference filter;
   (d) a second composite optical detector having third and fourth photosensitive elements disposed on opposite sides of a dividing line which is perpendicular to said optical axis and to a plane including the normal of said interference filter extending from a point where said optical axis intersects said interference filter, said second composite optical detector being responsive to light reflected from said interference filter;
   (e) an operating circuit responsive to output signals from said first through fourth photosensitive elements for producing a focussing error signal indicative of the focussing error of said optical system by detecting the difference between the sum of the output signals from the first and third photosensitive elements and the sum of the output signals from the second and fourth photosensitive elements; and
   (f) a driving circuit responsive to said focussing error signal for controlling the axial position of said condenser lens of said first means so as to image the light spot on said optical disk with a predetermined diameter.

14. A device as claimed in claim 13, wherein said operating circuit comprises a first subtractor responsive to the output signals from said first and second photosensitive elements, a second subtractor responsive to the output signals from said third and fourth photosensitive elements, and an adder responsive to the output signals from said first and second subtractors.

15. A device as claimed in claim 14, wherein said operating circuit further comprises another subtractor responsive to the the output signals from said first and second subtractors for producing a tracking error signal.

16. A device as claimed in claim 14, wherein said operating circuit further comprises another adder responsive to the the output signals from said first through fourth photosensitive elements for producing a reproduced information signal.

17. A device as claimed in claim 10 or 13 wherein interference filter is of a reflecting type.

18. A device as claimed in claim 8, 10 or 13, wherein said interference filter is of transmission type.

19. A device as claimed in claim 8, 10 or 13, further comprising a collimating lens interposed between said light source and said condenser lens.

20. A device as claimed in claim 8, 10 or 13, further comprising a convex lens disposed in the light path of said reflected rays at a point before said interference filter for collimating said reflected rays incident on said interference filter.

21. A device as claimed in claim 8, 10 or 13, further comprising a concave lens disposed in the light path of said reflected rays at a location between the disk and said interference filter for collimating said reflected rays incident on said interference filter.

22. A device as claimed in claim 8, 10 or 13, wherein said first means further comprises a trapezoidal prism for forming three beams from rays emitted from said light source.

23. A device as claimed in claim 22, wherein said composite optical detector further comprises two photosensitive elements responsive to two beams along said three beams, said two beams being located on opposite sides of a center beam, for deriving a tracking control signal.

24. A device as claimed in claim 8, 10 or 13, wherein said second means comprises a polarizing prism for reflecting rays reflected from said disk.

25. A device as claimed in claim 24, wherein said second means comprises a quarter wave plate interposed between said polarizing prism and said condenser lens.

26. The device of claim 8, 10 or 13 wherein said first means includes means for forming three beams from rays emitted by said source, said three beams being incident on the disk.

27. The device of claim 26 wherein the three beam forming means causes a central beam and two side beams to be formed on an information track of the disk, the two side beams being symmetrically located on opposite sides of the central beam.

* * * * *